(12) United States Patent
Izadi-Zamanabadi et al.

(10) Patent No.: US 9,644,874 B2
(45) Date of Patent: May 9, 2017

(54) METHOD FOR CONTROLLING A SUPPLY OF REFRIGERANT TO AN EVAPORATOR

(75) Inventors: Roozbeh Izadi-Zamanabadi, Soenderborg (DK); Lars Finn Sloth Larsen, Sydals (DK); Claus Thybo, Soenderborg (DK)

(73) Assignee: Danfoss A/S, Nordborg (DK)

(*) Notice: Subject to any disclaimer, the term of this patent is extended or adjusted under 35 U.S.C. 154(b) by 993 days.

(21) Appl. No.: 13/880,577

(22) PCT Filed: Oct. 19, 2011

(86) PCT No.: PCT/DK2011/000115
§ 371 (c)(1),
(2), (4) Date: Apr. 19, 2013

(87) PCT Pub. No.: WO2010/025728
PCT Pub. Date: Mar. 10, 2011

(65) Prior Publication Data
US 2013/0205815 A1 Aug. 15, 2013

(30) Foreign Application Priority Data
Oct. 20, 2010 (DK) .................... 2010 00951

(51) Int. Cl.
*F25B 41/04* (2006.01)
*F25B 49/02* (2006.01)
*F25B 41/06* (2006.01)

(52) U.S. Cl.
CPC ............ *F25B 49/02* (2013.01); *F25B 41/062* (2013.01); *F25B 2500/19* (2013.01); *F25B 2600/21* (2013.01)

(58) Field of Classification Search
CPC .... F25B 49/02; F25B 41/062; F25B 2600/21; F25B 2500/19
See application file for complete search history.

(56) References Cited

U.S. PATENT DOCUMENTS 4,848,099 A * 7/1989 Beckey ................ F25B 41/062
236/78 D
4,893,480 A 1/1990 Matsui et al.
(Continued)

FOREIGN PATENT DOCUMENTS

DE 196 03 175 A1 7/1997
DK WO2010025728 A1 * 3/2010
(Continued)

OTHER PUBLICATIONS

Vonsild et al., A Method for Calibrating a Superheat Sensor, Mar. 11, 2010, WO2010/025728A1, Whole Document.*
(Continued)

*Primary Examiner* — Larry Furdge
(74) *Attorney, Agent, or Firm* — McCormick, Paulding & Huber LLP

(57) ABSTRACT

A method for controlling a supply of refrigerant to an evaporator (5) of a vapor compression system (1), such as a refrigeration system, an air condition system or a heat pump, is disclosed. The vapor compression system (1) comprises an evaporator (5), a compressor (2), a condenser (3) and an expansion device (4) arranged in a refrigerant circuit. The method comprises the steps of: Actuating a component, such as an expansion valve (4), a fan or a compressor (2), of the vapor compression system (1) in such a manner that a dry zone in the evaporator (5) is changed; measuring a temperature signal representing a temperature of refrigerant leaving the evaporator (5); analyzing the measured temperature signal, e.g. including deriving a rate of change signal; determining a temperature value where a gain of a transfer function between the actuated component and the measured temperature drops from a maximum value to a minimum value, in a decreasing temperature direction; defining the determined temperature value as corresponding to a zero superheat (SH=0) value of refrigerant leaving the evaporator (Continued)

(5), and controlling a supply of refrigerant to the evaporator (5) in accordance with the defined SH=0 temperature value, and on the basis of the measured temperature signal. The method steps may be repeated at certain time intervals in order to provide updated determinations of the SH=0 temperature value. The method allows the SH=0 point to be determined purely on the basis of the measured temperature signal. Subsequently, the supply of refrigerant to the evaporator (5) can be controlled purely on the basis of the measured temperature signal.

20 Claims, 4 Drawing Sheets

(56) References Cited

U.S. PATENT DOCUMENTS

| | | | | |
|---|---|---|---|---|
| 5,299,869 | A | * | 4/1994 | Wissinger ............... G01K 11/12 250/227.23 |
| 5,426,952 | A | * | 6/1995 | Bessler ................. F25B 41/062 62/211 |
| 5,502,970 | A | * | 4/1996 | Rajendran ............. F25B 41/062 62/115 |
| 5,771,703 | A | | 6/1998 | Rajendran |
| 2004/0020223 | A1 | * | 2/2004 | Doi ......................... F25B 9/008 62/225 |

FOREIGN PATENT DOCUMENTS

| | | |
|---|---|---|
| JP | 9-303885 A | 11/1997 |
| WO | 2010/025728 A1 | 3/2010 |

OTHER PUBLICATIONS

"Identification and Control of a Dry-Expansion Evaporator", J. Parkam et al.; System Identification. Postprint Volume from the 1FACSYMPOSIUM. Proceedings of SYSID, XX, XX, Jan. 1, 1994, pp. 539-544, XP008058026.

Search Report for PCT Serial No. PCT/DK2011/000115 dated Feb. 1, 2012.

Chen, W. et al.: "Experimental investigation of a minimum stable superheat control system of an evaporator", International Journal of Refrigeration, Elsevier, Paris, FR. vol. 25, No. 8, Dec. 1, 2002; pp. 1137-1142, XPOO4388595, ISSN: 0140-7007, D01: 10.1016/S0140-7007(01)00107-4.

* cited by examiner

METHOD FOR CONTROLLING A SUPPLY OF REFRIGERANT TO AN EVAPORATOR

CROSS REFERENCE TO RELATED APPLICATIONS

This application is entitled to the benefit of and incorporates by reference essential subject matter disclosed in International Patent Application No. PCT/DK2011/000115 filed on Oct. 19, 2011 and Danish Patent Application No. PA 2010 00951 filed Oct. 20, 2010.

FIELD OF THE INVENTION

The present invention relates to a method for controlling a supply of refrigerant to an evaporator, in particular to an evaporator which forms part of a vapour compression system, such as a refrigeration system, an air condition system or a heat pump. According to the method of the present invention, the supply of refrigerant to the evaporator can be controlled solely on the basis of measurements of the temperature of refrigerant leaving the evaporator.

BACKGROUND OF THE INVENTION

Vapour compression systems, such as refrigeration systems, air condition systems or heat pumps, normally comprise a compressor, a condenser, an expansion device, and an evaporator arranged along a refrigerant path. Refrigerant circulates the refrigerant path and is alternatingly expanded and compressed, and heat exchange takes place in the condenser and the evaporator. Expanded refrigerant enters the evaporator in a mixed state of gaseous and liquid refrigerant. As the refrigerant passes through the evaporator, it evaporates while exchanging heat with a secondary fluid flow, such as an air flow, across the evaporator. In order to utilise the potential refrigerating capacity of the evaporator to a maximum extend, it is desirable that liquid refrigerant is present along the entire length of the evaporator. On the other hand, it is undesirable that liquid refrigerant passes through the evaporator and into the suction line, since it may cause damage to the compressor if liquid refrigerant reaches the compressor. It is therefore desirable to control the supply of refrigerant to the evaporator in such a manner that the boundary between mixed phase refrigerant and gaseous refrigerant is exactly at the outlet of the evaporator.

In order to obtain this, the superheat of the refrigerant leaving the evaporator is often measured and/or calculated. The superheat is the difference between the temperature of the refrigerant leaving the evaporator and the dew point of the refrigerant leaving the evaporator. A low superheat value, thus, indicates that the temperature of the refrigerant leaving the evaporator is close to the dew point, while a high superheat indicates that the temperature of the refrigerant leaving the evaporator is significantly higher than the dew point, and that a significant part of the evaporator therefore contains gaseous refrigerant. Thereby a significant part of the potential refrigerating capacity of the evaporator is used for heating gaseous refrigerant rather than for evaporating liquid refrigerant. It is then attempted to control the supply of refrigerant to the evaporator in such a manner that the superheat is maintained at small, but positive, level.

In order to obtain the superheat of refrigerant leaving the evaporator, the temperature as well as the pressure of the refrigerant leaving the evaporator is normally measured. As an alternative, the temperature of refrigerant leaving the evaporator and the temperature of refrigerant entering the evaporator may be measured. Thus, it is necessary to use two different sensor devices in order to obtain the superheat. This adds to the manufacturing costs of the vapour compression system. Furthermore, in the case that a pressure sensor is applied for measuring the pressure of the refrigerant leaving the evaporator, there is a risk that the pressure sensor falls out or malfunctions, thereby making it impossible to measure the superheat and preventing proper control of the supply of refrigerant to the evaporator, until the pressure sensor is restored.

U.S. Pat. No. 4,893,480 discloses a refrigeration cycle or an air conditioner including a refrigeration cycle subjected to feedback control based on modern control theory. A control output from a controlled object includes a temperature of air at a point downstream of the evaporator or a superheat of refrigerant. The superheat is derived from measurements of the temperature of refrigerant entering the evaporator and the temperature of refrigerant leaving the evaporator.

SUMMARY OF THE INVENTION

It is an object of embodiments of the invention to provide a method for controlling a supply of refrigerant to an evaporator, the method reducing the risk of errors due to sensor fallout.

It is a further object of embodiments of the invention to provide a method for controlling a supply of refrigerant to an evaporator, the method allowing the manufacturing costs of a vapour compression system comprising the evaporator to be reduced.

It is an even further object of embodiments of the invention to provide a control system for controlling a supply of refrigerant to an evaporator, the control system reducing the risk of errors due to sensor fallout.

According to a first aspect the invention provides a method for controlling a supply of refrigerant to an evaporator of a vapour compression system, the vapour compression system comprising an evaporator, a compressor, a condenser and an expansion device arranged in a refrigerant circuit, the method comprising the steps of:

actuating a component of the vapour compression system in such a manner that a dry zone in the evaporator is changed, measuring a temperature signal representing a temperature of refrigerant leaving the evaporator, analysing the measured temperature signal, determining a temperature value where a gain of a transfer function between the actuated component and the measured temperature drops from a maximum value to a minimum value, in a decreasing temperature direction, defining the determined temperature value as corresponding to a zero superheat (SH=0) value of refrigerant leaving the evaporator, and controlling a supply of refrigerant to the evaporator in accordance with the defined SH=0 temperature value, and on the basis of the measured temperature signal.

In the present context the term 'vapour compression system' should be interpreted to mean any system in which a flow of fluid medium, such as refrigerant, circulates and is alternatingly compressed and expanded, thereby providing either refrigeration or heating of a volume. Thus, the vapour compression system may be a refrigeration system, an air condition system, a heat pump, etc.

According to the method of the first aspect of the invention a component of the vapour compression system is initially actuated in such a manner that a dry zone in the evaporator is changed. The component may, e.g., be the expansion device, a fan controlling a secondary air flow across the evaporator, or the compressor. For instance, actuating the expansion device, e.g. by decreasing/increasing the opening degree of an expansion valve increases/decreases the length of the dry zone in the evaporator. Actuating a fan controlling a secondary air flow, e.g. by increasing/decreasing the speed of the fan, increases/decreases the length of the dry zone in the evaporator. Finally, actuating the compressor, e.g. by increasing/decreasing the speed of the compressor or by switching on/off a compressor stage, increases/decreases the length of the dry zone in the evaporator.

In the present context the term 'dry zone of the evaporator' should be interpreted to mean a part of the evaporator containing only gaseous refrigerant. A dry zone of a long length thereby indicates that liquid refrigerant is evaporated in the evaporator well before reaching the evaporator outlet, while a dry zone of a short length indicates that liquid refrigerant is present along a substantial part of the evaporator.

During the actuating step, a temperature signal representing a temperature of refrigerant leaving the evaporator is measured. This may include directly measuring the temperature of the refrigerant leaving the evaporator, e.g. by means of a temperature sensor arranged in the suction line, immediately downstream relatively to an outlet of the evaporator. As an alternative, the temperature signal may be obtained in an indirect manner, and/or the temperature signal may be a signal which depends upon and reflects variations in the temperature of the refrigerant leaving the evaporator without being the exact temperature.

Thus, a temperature signal is obtained which provides information regarding variations in the temperature of the refrigerant leaving the evaporator in response to the changes in dry zone of the evaporator, caused by the actuation of the component of the vapour compression system.

The measured temperature signal is then analysed in order to determine a temperature value where a gain of a transfer function between the actuated component and the measured temperature drops from a maximum value to a minimum value, in a decreasing temperature direction. It should be noted that the gain may be negative, in which case the gain drop is actually an increase in gain from a large negative gain to a small negative gain. Thus, in any event the absolute gain value drops from a maximum valve to a minimum value.

In the present context the term 'transfer function between the actuated component and the measured temperature' should be interpreted to mean a mathematical representation of the relation between an input, in this case the actuation of the component, and an output, in this case the measured temperature signal. The gain of the transfer function defines this relationship. The gain is not necessarily a constant, but may very well depend on one or more variable parameters, including the actuation of the component.

As mentioned above, it is desirable to control the supply of refrigerant to the evaporator in such a manner that the superheat of the refrigerant leaving the evaporator is as close as possible to zero, but positive. In this case liquid refrigerant is present essentially along the entire length of the evaporator, i.e. essentially up to the outlet of the evaporator, but liquid refrigerant does not leave the evaporator. It has been found by the inventors of the present invention that when the dry zone of the evaporator is gradually decreased until the situation described above is obtained, by actuating a component of the vapour compression system, the gain of the transfer function exhibits a very significant behaviour immediately before the zero superheat level is reached. This is due to the fact that the evaporator suddenly no longer delivers gaseous and heated refrigerant, but delivers refrigerant with zero superheat, or even liquid refrigerant.

More particularly, the inventors of the present invention have found that, immediately before the SH=0 situation is reached, the gain of the transfer function increases significantly until a maximum value is reached, and then the gain decreases dramatically to a minimum value which is close to zero. A zero gain of a transfer function indicates that changes in the input of the transfer function have no effect on the output. Thus, when the minimum gain value is reached, further changes in the actuation of the component of the vapour compression system will not result in further changes in the measured temperature signal. This indicates that gaseous refrigerant is no longer heated in the refrigerator, but that gaseous refrigerant at the dew point, or possibly liquid refrigerant, is leaving the evaporator. Accordingly, the point where the dramatic decrease in the gain of the transfer function takes place is the point where the superheat of the refrigerant leaving the evaporator is minimal, i.e. liquid refrigerant is present throughout the evaporator, but no liquid refrigerant leaves the evaporator.

Thus, when the behaviour described above is detected in the measured temperature signal, it can be assumed that the SH=0 point has been reached, i.e. that the temperature at which this occurs is the dew point, or very close to the dew point, of the refrigerant at the current pressure level. Accordingly, according to the method of the invention, the determined temperature value is defined as corresponding to a SH=0 value of refrigerant leaving the evaporator.

Finally, the supply of refrigerant to the evaporator is controlled in accordance with the defined SH=0 temperature value, and on the basis of the measured temperature signal. Assuming that variations in the pressure of the refrigerant leaving the evaporator are much slower than variations in the temperature of the refrigerant, it is possible to control the supply of refrigerant to the evaporator purely on the basis of the measured temperature of the refrigerant leaving the evaporator, once the SH=0 temperature value has been defined, at least for a period of time reflecting the time scale of variations of the pressure. Thus, according to the method of the first aspect of the invention, it is possible to control the supply of refrigerant to the evaporator in such a manner that a minimal superheat is obtained, but using only one sensor, i.e. a temperature sensor. Thereby the manufacturing costs of the vapour compression system are reduced and the risk of malfunction due to a pressure sensor falling out is avoided.

The method steps described above, resulting in defining the SH=0 temperature value, may be repeated at certain time intervals in order to obtain an updated SH=0 temperature value. Thereby changes in the pressure of the refrigerant and/or changes in ambient condition may be taken into account.

The step of actuating a component may comprise adjusting a supply of refrigerant to the evaporator. This may, e.g., be obtained by adjusting an opening degree of a valve, such as an expansion valve, arranged upstream relatively to the evaporator. As described above, when the opening degree is increased, the mass flow of refrigerant supplied to the evaporator is also increased, and thereby the dry zone in the evaporator is decreased. Similarly, when the opening degree is decreased, the mass flow of refrigerant supplied to the evaporator is also decreased, and thereby the length of the dry zone in the evaporator is increased.

As an alternative, the step of actuating a component may comprise adjusting a secondary fluid flow, such as an air flow across the evaporator. This may, e.g., be obtained by adjusting the speed of a fan arranged to create the secondary fluid flow. When the speed of the fan is increased, thereby increasing the mass flow of the secondary fluid flow across the evaporator, the evaporation of refrigerant in the evaporator is increased, and thereby the length of the dry zone in the evaporator is increased. Similarly, when the speed of the fan is decreased, thereby decreasing the mass flow of the secondary fluid flow across the evaporator, the evaporation of the refrigerant in the evaporator is decreased, and thereby the length of the dry zone in the evaporator is decreased.

As another alternative, the step of actuating a component may comprise adjusting a compressor capacity of the compressor. This may, e.g., be obtained by adjusting a speed of the compressor or by switching a compressor stage on or off. When the compressor capacity in increased, the suction pressure is decreased, and thereby the length of the dry zone in the evaporator is increased. Similarly, when the compressor capacity is decreased, the suction pressure is increased, and thereby the length of the dry zone in the evaporator is decreased.

The step of actuating a component may comprise pulsating the length of the dry zone of the evaporator. This should be interpreted to include that the length of the dry zone is alternatingly increased and decreased in any suitable manner, such as in accordance with a sinusoidal, triangular, square, or any other suitable pattern. It should also be interpreted to include a situation in which the length of the dry zone is changed in accordance with a step function.

According to this embodiment, the input of the transfer function, i.e. the actuation of the component of the vapour compression system, is pulsated. Due to the transfer function, these pulsations are transferred to the output, i.e. to the measured temperature of the refrigerant leaving the evaporator. Significant changes in the gain of the transfer function have a significant impact on the pulsations of the measured temperature, in particular on the amplitude of these pulsations. Accordingly, the point where the gain drops from a maximum value to a minimum value can easily be detected by studying the pulsations of the measured temperature signal. Thus, pulsating the length of the dry zone makes it easier to identify the temperature corresponding to SH=0.

The step of measuring a temperature signal may be performed by substantially continuously measuring the temperature of refrigerant leaving the evaporator. Alternatively, the step of measuring a temperature signal may be performed by measuring the temperature of refrigerant leaving the evaporator at predefined time intervals, e.g. by sampling.

The step of analysing the measured temperature signal may comprise deriving a rate of change signal of the temperature signal and analysing the rate of change signal in order to establish whether or not a local extremum occurs in the rate of change signal, and the step of defining a SH=0 temperature value may comprise defining the SH=0 temperature value at the temperature corresponding to the local extremum.

According to this embodiment, the rate of change of the temperature of the refrigerant leaving the evaporator, or the 'time derivative' of this temperature, is analysed. Accordingly, it is the temporal behaviour of the temperature signal which is investigated. Furthermore, during the analysis it is attempted to locate a local extremum in the rate of change signal, i.e. a point where the rate of change is particularly high or particularly low. It should be noted that in the present context the term 'local extremum' should not be interpreted to include small extremums occurring as a result of fluctuations or noise in the temperature signal, but should only be interpreted to include 'real' extremums of the rate of change signal arising as a result of the temporal behaviour of the temperature signal.

As described above, the inventors of the present invention have found that the behaviour of the temperature signal around the point where the SH=0 situation is reached, is very characteristic, and involves a significant and sudden drop in gain of the transfer function, which corresponds to a distinct local minimum in the rate of change signal of the temperature signal. When such a local extremum is located, it can therefore be assumed that the temperature corresponding to SH=0 has been found.

The step of controlling a supply of refrigerant to the evaporator may comprise generating a control signal to the expansion device to reduce the supply of refrigerant to the evaporator in the case that a local extremum occurs in the rate of change signal. As described above, it is desirable to prevent large amounts of liquid refrigerant from passing through the evaporator and into the suction line. Thus, when the SH=0 situation is reached, the length of the dry zone should be increased, or at least not be further decreased, and this can be obtained by reducing the supply of refrigerant to the evaporator. The expansion device may be or comprise an expansion valve, in which case the generated control signal may instruct the expansion valve to decrease an opening degree.

As an alternative, the length of the dry zone of the evaporator may, e.g., be increased by temporarily switching off a fan providing a secondary fluid flow across the evaporator.

The step of analysing the rate of change signal may comprise establishing whether or not a local minimum occurs in the rate of change signal, as described above. As an alternative, the step of analysing the rate of change signal may comprise establishing whether or not a local maximum occurs in the rate of change signal.

The method may further comprise the step of feeding the measured temperature signal to a bandpass filter prior to performing the step of analysing the measured temperature signal. According to this embodiment, noise is filtered out of the temperature signal before the signal is analysed. As an alternative, another suitable filter may be used.

The rate of change of the temperature signal may be obtained in any suitable manner, e.g. using numeric or linear algebraic methods.

According to a second aspect the invention provides a control system for controlling a supply of refrigerant to an evaporator of a vapour compression system, the control system comprising:

actuating means arranged to actuate a component of the vapour compression system in such a manner that a dry zone in the evaporator is changed, a temperature sensor arranged to measure a temperature of refrigerant leaving the evaporator, thereby obtaining a temperature signal, and processing means arranged to analyse the measured temperature signal in order to determine a temperature value where a gain of a transfer function between the actuated component and the measured temperature drops from a maximum value to a minimum value, in a decreasing temperature direction, and to define the determined temperature value as corresponding to a zero superheat (SH=0) value of refrigerant leaving the evaporator, wherein the control system is adapted to control a supply of refrigerant to the evaporator in accordance with the defined SH=0 temperature value, and on the basis of the measured temperature signal.

It should be noted that a skilled person would readily recognise that any feature described in combination with the first aspect of the invention could also be combined with the second aspect of the invention, and vice versa.

The control system according to the second aspect of the invention is very suitable for performing the method steps according to the first aspect of the invention. The remarks set forth above are therefore equally applicable here.

The processing means may be arranged to derive a rate of change signal of the temperature signal, to analyse the rate of change signal in order to establish whether or not a local extremum occurs in the rate of change signal, and to generate a control signal instructing an expansion device to reduce the supply of refrigerant to the evaporator in the case that a local extremum occurs in the rate of change signal. This has already been described above with reference to the first aspect of the invention.

As described above, the control system may be adapted to perform the method steps of the first aspect of the invention.

The invention further relates to a vapour compression system comprising an evaporator, a compressor, a condenser, and an expansion device arranged in a refrigerant circuit, and a control system according to the second aspect of the invention.

BRIEF DESCRIPTION OF THE DRAWINGS

The invention will now be described in further detail with reference to the accompanying drawings in which.

DETAILED DESCRIPTION

Figure 1:
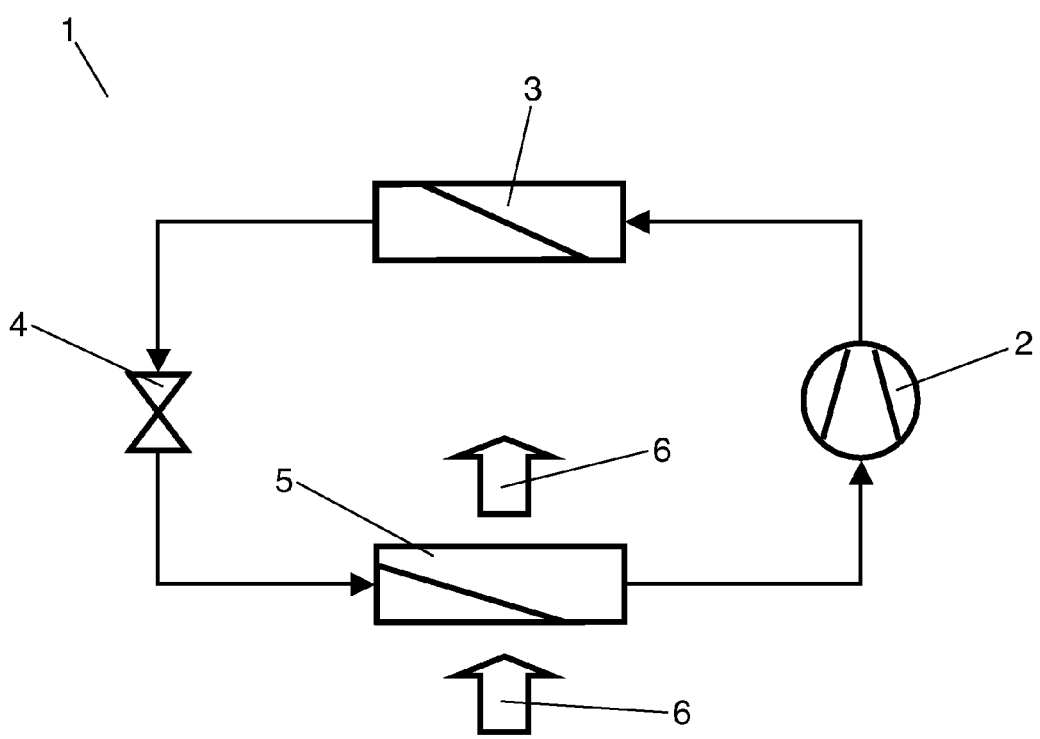
FIG. 1 is a diagrammatic view of a vapour compression system.

FIG. 1 is a diagrammatic view of a vapour compression system 1. The vapour compression system 1 comprises a compressor 2, a condenser 3, an expansion device 4 and an evaporator 5 arranged in a refrigerant path. During operation, refrigerant flowing in the refrigerant path is compressed in the compressor 2. The compressed refrigerant is supplied to the condenser 3, where it condenses, the refrigerant leaving the condenser 3 thereby being in a substantially liquid state. The refrigerant is then supplied to the expansion device 4 where it is expanded, thereby forming a mixed state refrigerant, i.e. a mixture of gaseous and liquid refrigerant is supplied from the expansion device 4 to the evaporator 5. In the evaporator 5, the liquid part of the refrigerant is evaporated while exchanging heat with a secondary fluid flow, such as an air flow, across the evaporator 5, illustrated by arrows 6. Finally, the refrigerant is once again supplied to the compressor, thereby completing the cycle.

Figure 2:
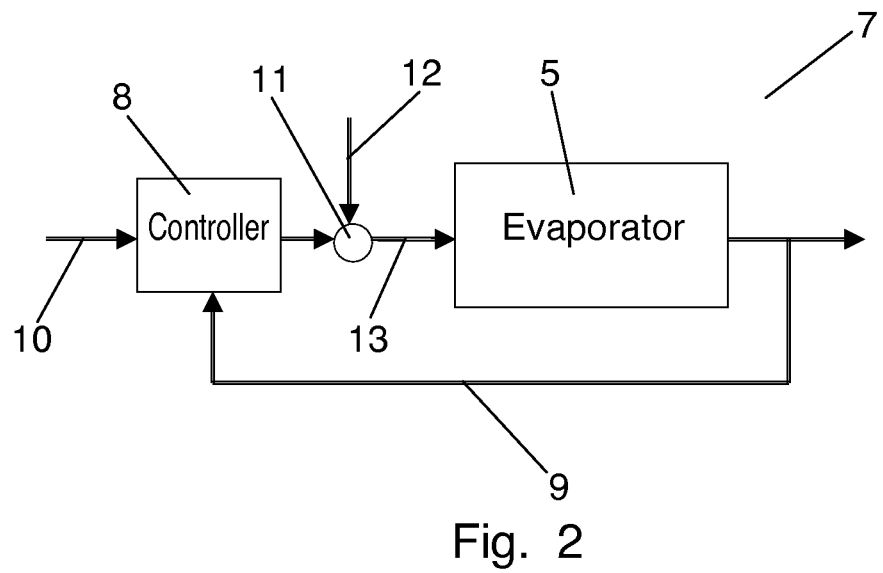
FIG. 2 is a diagrammatic view of a control system according to a first embodiment of the invention.

FIG. 2 is a diagrammatic view of a control system 7 according to a first embodiment of the invention. The control system 7 of FIG. 2 is adapted to control a supply of refrigerant to an evaporator 5 of a vapour compression system 1, e.g. the vapour compression system 1 of FIG. 1, in accordance with a method according to the invention.

The temperature of refrigerant leaving the evaporator 5 is measured and supplied to a controller 8 as a temperature signal 9. The controller 8 also receives a reference input 10. Based on the temperature signal 9 and the reference signal 10, the controller 8 generates a signal for adder 11. Adder 11 also receives an auxiliary pulsing signal 12. Based on the signal received from the controller 8 and the auxiliary pulsing signal 12, the adder 11 generates an actuation signal 13 for a component of the vapour compression system 1. As described above, the component may, e.g., be an expansion valve 4, a fan controlling the secondary fluid flow 6 across the evaporator 5, or the compressor 2. In any event, the actuation signal 13 causes the component to be actuated in such a manner that the length of the dry zone in the evaporator 5 is changed. The length of the dry zone may be increased, decreased or 'pulsed' in the sense that it is alternatingly increased and decreased.

The change in length of the dry zone causes a change in the temperature of refrigerant leaving the evaporator 5, and thereby the temperature signal 9 is also changed. Accordingly, a kind of 'feedback loop' is established.

The controller 8 is adapted to analyse the temperature signal 9 in the manner described above in order to determine the temperature value corresponding to SH=0. The controller 8 is further adapted to control the supply of refrigerant to the evaporator 5 based on the determined SH=0 temperature, and on the basis of the measured temperature signal 9.

The auxiliary pulsing signal 12 defines a pulsating or stepped actuation of the component which 'kicks' the dynamics of the vapour compression system 1 in a manner which makes it easier to accurately locate the temperature value corresponding to SH=0. The relationship between the changes in the actuation signal 13 caused by the auxiliary pulsing signal 12, and the changes in the temperature signal 9 are determined by a transfer function.

Operating a vapour compression system 1 by means of the control system 7 of FIG. 2 allows the SH=0 point to be identified purely on the basis of the temperature of the refrigerant leaving the evaporator 5, i.e. without the requirement of a measurement of the pressure of the refrigerant. When the SH=0 temperature has been identified, the supply of refrigerant to the evaporator 5 can be controlled purely on the basis of the temperature measurement. Thus, a pressure sensor is not required, thereby reducing the manufacturing costs of the vapour compression system 1 and eliminating a possible source of error.

Figure 3:
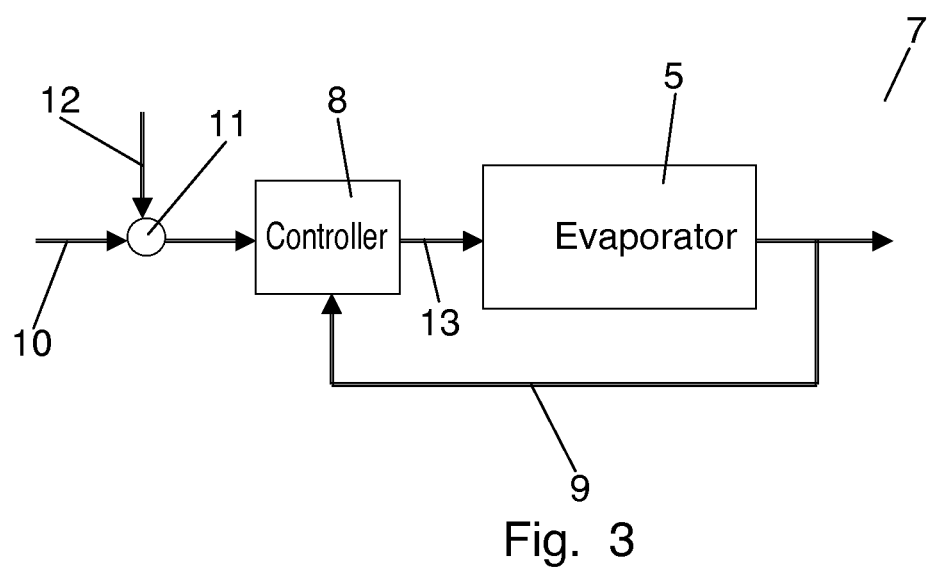
FIG. 3 is a diagrammatic view of a control system according to a second embodiment of the invention.

FIG. 3 is a diagrammatic view of a control system 7 according to a second embodiment of the invention. The control system 7 of FIG. 3 is similar to the control system 7 shown in FIG. 2, and it will therefore not be described in detail here.

In the control system 7 of FIG. 3, the adder 11 receives the reference signal 10 and the auxiliary pulsing signal 12, and generates an input signal for the controller 8. The controller 8 receives this signal as well as the measured temperature signal 9, and generates an actuation signal 13 based on the received signals. However, the control system 7 of FIG. 3 operates substantially as the control system 7 of FIG. 2, and reference is therefore made to the description above.

Figure 4:
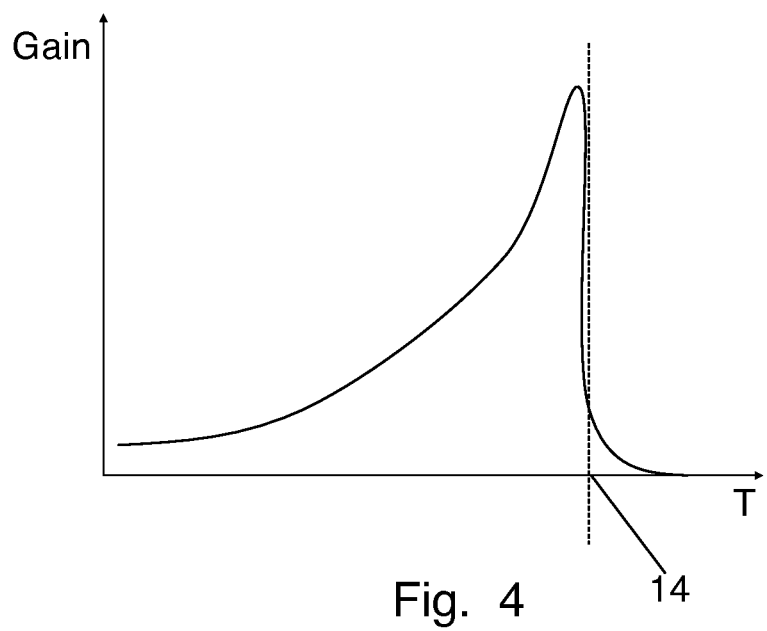
FIG. 4 is a graph illustrating gain of a transfer function as a function of refrigerant outlet temperature.

FIG. 4 is a graph illustrating gain of a transfer function as a function of temperature, T, of the refrigerant leaving the evaporator 5. The transfer function defines a relationship between actuation of a component of a vapour compression system 1 and temperature of refrigerant leaving the evaporator 5 of the vapour compression system.

The dotted line indicates the temperature value 14 which corresponds to SH=0. It is clear from FIG. 4 that the gain, i.e. the absolute value of the gain, increases steadily as a function of increasing temperature, until a maximum value is reached shortly before the SH=0 temperature 14 is reached. Then the gain decreases dramatically to a minimum value. The dramatic decrease in the gain at the SH=0 temperature leaves a significant trace in the behaviour of a temperature signal reflecting the temperature of the refrigerant leaving the evaporator 5. Accordingly, looking for this trace allows the SH=0 point to be determined purely on the basis a measured temperature signal.

Figure 5:
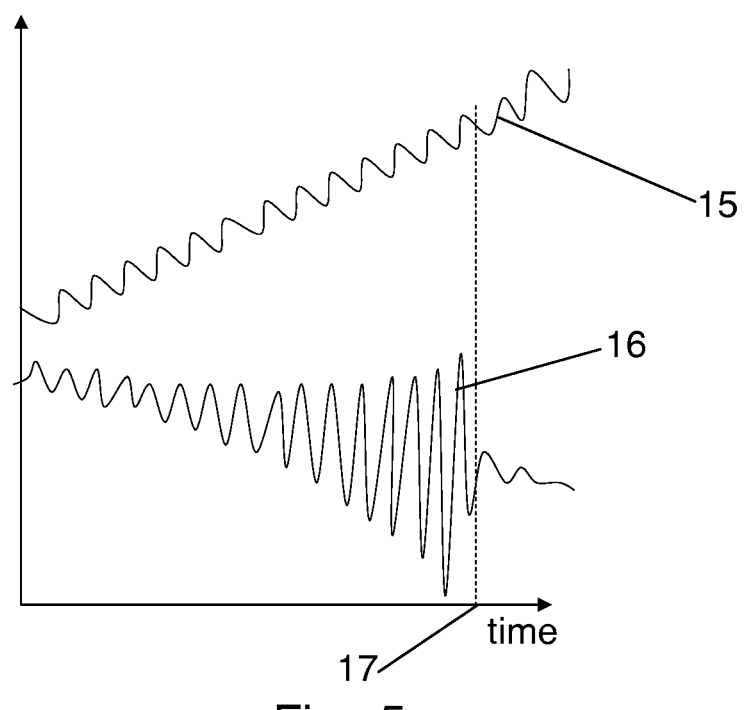
FIG. 5 is a graph illustrating the relation between actuator input and refrigerant outlet temperature.

FIG. 5 is a graph illustrating related values of actuation input 15 and refrigerant outlet temperature 16 as a function of time. The curves 15, 16 may, e.g., be obtained by means of one of the control systems 7 of FIGS. 2 and 3. The dotted curve indicates the point in time 17 where the SH=0 situation is reached.

It can be seen from the graph of FIG. 5 that the actuation input 15 is pulsated about a mean value which increases as a function of time. As a result of the changes in the actuation input 15, the temperature signal 16 also pulsates. As the time 17 corresponding to SH=0 is approached, the amplitude of the temperature signal 16 increases, and when the SH=0 situation is reached, the amplitude decreases dramatically. Such behaviour is easily detected and provides an efficient manner of determining the SH=0 point purely on the basis of the temperature measurements.

Figure 6:
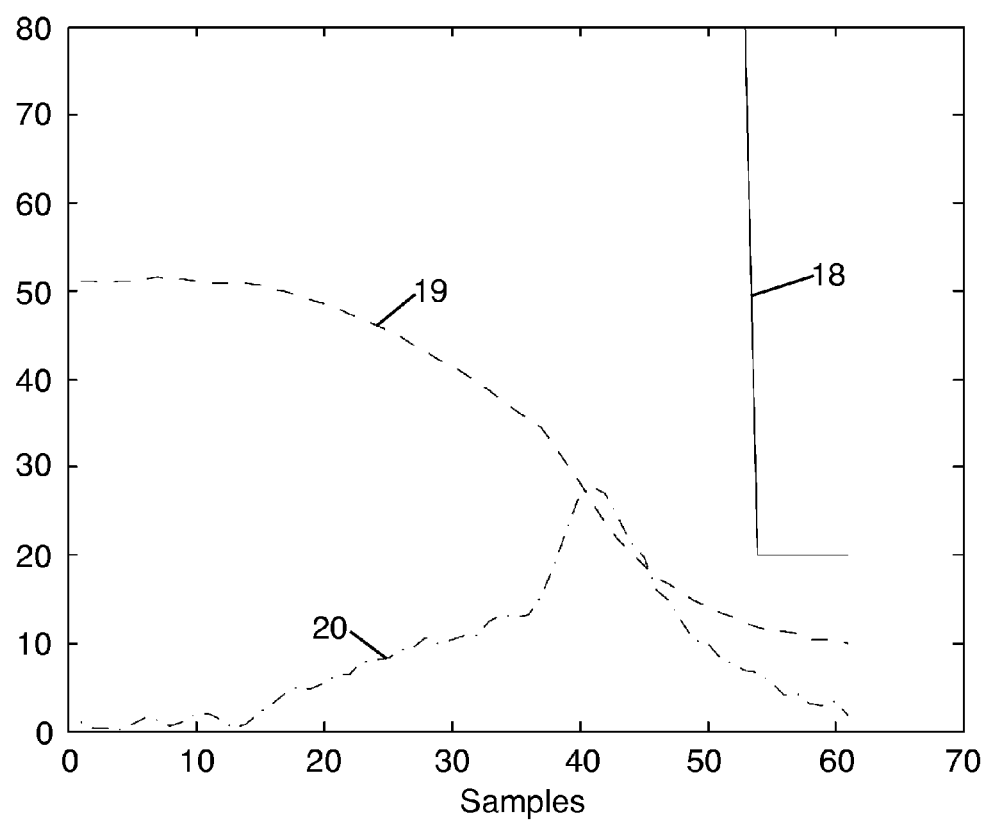
FIG. 6 is a graph illustrating the relation between opening degree of an expansion valve, refrigerant outlet temperature and gain of a transfer function.

FIG. 6 is a graph illustrating the relation between opening degree 18 of an expansion valve 5, refrigerant outlet temperature 19 and gain 20 of a transfer function. All of the curves 18, 19, 20 are plotted as a function of time.

The curves 18, 19, 20 of FIG. 6 may be used in the following manner. Initially, the opening degree 18 of the expansion valve 5 is maintained at a substantially constant, high level, and the temperature signal 19 is monitored. When the supply of refrigerant to the evaporator 5 causes the length of the dry zone in the evaporator 5 to decrease, the temperature 19 of the refrigerant leaving the evaporator 5 also decreases. Furthermore, it is clear that the absolute value of the gain 20 of the transfer function increases.

At a certain point in time, the decrease in the temperature signal 19 becomes more rapid, i.e. the rate of change of the temperature signal 19 drops before reaching a minimum value. It is clear from the graph that the gain 20 increases significantly and then decreases at this point in time. As explained above, this corresponds to the SH=0 situation. Accordingly, searching for the described behaviour in the rate of change of the temperature signal 19 allows the SH=0 point to be determined.

When the SH=0 point has been determined, a control signal is generated for the expansion valve, causing the opening degree 18 to be changed to a lower, substantially constant level, in order to prevent that liquid refrigerant passes through the evaporator 5.

Although various embodiments of the present invention have been described and shown, the invention is not restricted thereto, but may also be embodied in other ways within the scope of the subject-matter defined in the following claims.

What is claimed is:

1. A method for controlling a supply of refrigerant to an evaporator of a vapour compression system, the vapour compression system comprising an evaporator, a compressor, a condenser and an expansion device arranged in a refrigerant circuit, the method comprising the steps of:
    actuating a component of the vapour compression system in such a manner that a dry zone in the evaporator is changed,
    measuring a temperature signal representing a temperature of refrigerant leaving the evaporator,
    analysing the measured temperature signal,
    determining a temperature value where a gain of a transfer function between the actuated component and the measured temperature drops from a maximum value to a minimum value, in a decreasing temperature direction,
    defining the determined temperature value as corresponding to a zero superheat (SH=0) value of refrigerant leaving the evaporator, and
    controlling a supply of refrigerant to the evaporator in accordance with the defined SH=0 temperature value, and on the basis of the measured temperature signal.

2. The method according to claim 1, wherein the step of actuating a component comprises adjusting a supply of refrigerant to the evaporator.

3. The method according to claim 1, wherein the step of actuating a component comprises pulsating the length of the dry zone of the evaporator.

4. The method according to claim 1, wherein the step of measuring a temperature signal is performed by continuously measuring the temperature of refrigerant leaving the evaporator.

5. The method according to claim 1, wherein the step of measuring a temperature signal is performed by measuring the temperature of refrigerant leaving the evaporator at predefined time intervals.

6. The method according to claim 1, wherein the step of analysing the measured temperature signal comprises deriving a rate of change signal of the temperature signal and analysing the rate of change signal in order to establish whether or not a local extremum occurs in the rate of change signal, and wherein the step of defining a SH=0 temperature value comprises defining the SH=0 temperature value at the temperature corresponding to the local extremum.

7. The method according to claim 6, wherein the step of controlling a supply of refrigerant to the evaporator comprises generating a control signal to the expansion device to reduce the supply of refrigerant to the evaporator in the case that a local extremum occurs in the rate of change signal.

8. The method according to claim 7, wherein the expansion device is or comprises an expansion valve, and wherein the generated control signal instructs the expansion valve to decrease an opening degree.

9. The method according to claim 6, wherein the step of analysing the rate of change signal comprises establishing whether or not a local minimum occurs in the rate of change signal.

10. The method according to claim 1, further comprising the step of feeding the measured temperature signal to a bandpass filter prior to performing the step of analysing the measured temperature signal.

11. A control system for controlling a supply of refrigerant to an evaporator of a vapour compression system, the control system comprising:
    an actuator arranged to actuate a component of the vapour compression system in such a manner that a dry zone in the evaporator is changed,
    a temperature sensor arranged to measure a temperature of refrigerant leaving the evaporator, thereby obtaining a temperature signal, and a controller arranged to analyse the measured temperature signal in order to determine a temperature value where a gain of a transfer function between the actuated component and the measured temperature drops from a maximum value to a minimum value, in a decreasing temperature direction, and to define the determined temperature value as corresponding to a zero superheat (SH=0) value of refrigerant leaving the evaporator, wherein the control system is adapted to control a supply of refrigerant to the evaporator in accordance with the defined SH=0 temperature value, and on the basis of the measured temperature signal.

12. The control system according to claim 11, wherein the controller is arranged to derive a rate of change signal of the temperature signal, to analyse the rate of change signal in order to establish whether or not a local extremum occurs in the rate of change signal, and to generate a control signal instructing an expansion device to reduce the supply of refrigerant to the evaporator in the case that a local extremum occurs in the rate of change signal.

13. The control system according to claim 11, wherein the control system is adapted to perform the method steps of:

actuating a component of the vapour compression system in such a manner that a dry zone in the evaporator is changed, measuring a temperature signal representing a temperature of refrigerant leaving the evaporator, analysing the measured temperature signal, determining a temperature value where a gain of a transfer function between the actuated component and the measured temperature drops from a maximum value to a minimum value, in a decreasing temperature direction, defining the determined temperature value as corresponding to a zero superheat (SH=0) value of refrigerant leaving the evaporator, and controlling a supply of refrigerant to the evaporator in accordance with the defined SH=0 temperature value, and on the basis of the measured temperature signal.

14. The method according to claim 2, wherein the step of actuating a component comprises pulsating the length of the dry zone of the evaporator.

15. The method according to claim 2, wherein the step of measuring a temperature signal is performed by continuously measuring the temperature of refrigerant leaving the evaporator.

16. The method according to claim 3, wherein the step of measuring a temperature signal is performed by continuously measuring the temperature of refrigerant leaving the evaporator.

17. The method according to claim 2, wherein the step of measuring a temperature signal is performed by measuring the temperature of refrigerant leaving the evaporator at predefined time intervals.

18. The method according to claim 3, wherein the step of measuring a temperature signal is performed by measuring the temperature of refrigerant leaving the evaporator at predefined time intervals.

19. The method according to claim 2, wherein the step of analysing the measured temperature signal comprises deriving a rate of change signal of the temperature signal and analysing the rate of change signal in order to establish whether or not a local extremum occurs in the rate of change signal, and wherein the step of defining a SH=0 temperature value comprises defining the SH=0 temperature value at the temperature corresponding to the local extremum.

20. A vapour compression system comprising an evaporator, a compressor, a condenser, an expansion device arranged in a refrigerant circuit, and a control system adapted to perform a method comprising the steps of:

actuating a component of the vapour compression system in such a manner that a dry zone in the evaporator is changed, measuring a temperature signal representing a temperature of refrigerant leaving the evaporator, analysing the measured temperature signal, determining a temperature value where a gain of a transfer function between the actuated component and the measured temperature drops from a maximum value to a minimum value, in a decreasing temperature direction, defining the determined temperature value as corresponding to a zero superheat (SH=0) value of refrigerant leaving the evaporator, and controlling a supply of refrigerant to the evaporator in accordance with the defined SH=0 temperature value, and on the basis of the measured temperature signal.

* * * * *

UNITED STATES PATENT AND TRADEMARK OFFICE
CERTIFICATE OF CORRECTION

PATENT NO. : 9,644,874 B2  
APPLICATION NO. : 13/880577  
DATED : May 9, 2017  
INVENTOR(S) : Izadi-Zamanabadi et al.

Page 1 of 1

It is certified that error appears in the above-identified patent and that said Letters Patent is hereby corrected as shown below:

On the Title Page

Item [87], under PCT Publication No.: replace "WO2010/025728" with --WO2012/052019--.

Item [87], under PCT Publication Date: replace "March 10, 2011" with --April 26, 2012--.

Signed and Sealed this  
Twenty-first Day of November, 2017

Joseph Matal  
*Performing the Functions and Duties of the*  
*Under Secretary of Commerce for Intellectual Property and*  
*Director of the United States Patent and Trademark Office*